UNITED STATES PATENT OFFICE.

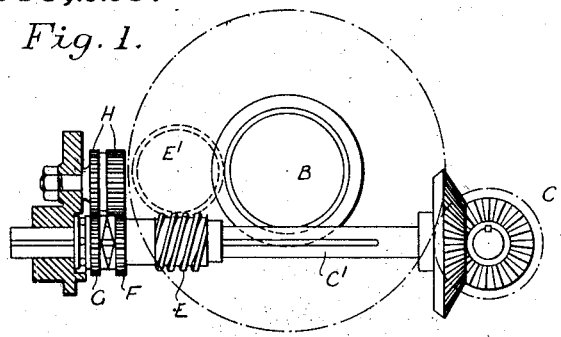
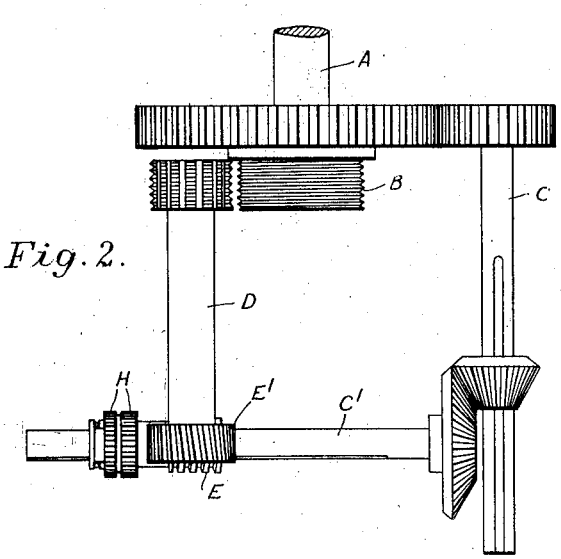
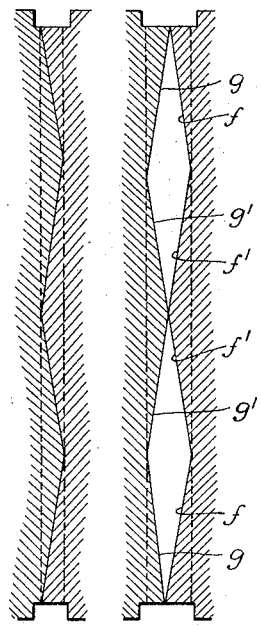
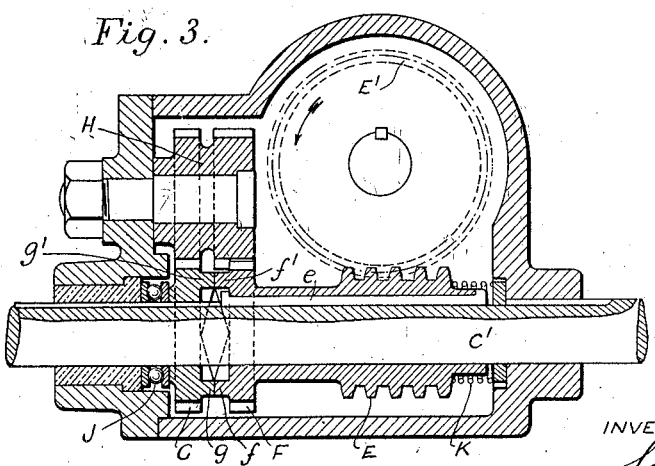
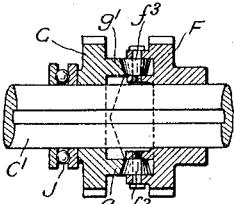

GEORGE RICHARDS, OF WESTMINSTER, LONDON, ENGLAND.

MEANS APPLICABLE FOR USE IN MILLING SCREW-THREADS.

1,339,223.      Specification of Letters Patent.      Patented May 4, 1920.

Application filed June 9, 1919. Serial No. 302,922.

*To all whom it may concern:*

Be it known that I, GEORGE RICHARDS, a citizen of the United States, residing at the Outer Temple, 222 Strand, in the city of Westminster, London, England, have invented new and useful Improved Means Applicable for Use in Milling Screw-Threads, of which the following is a specification.

This invention relates to improved means for automatically varying the point at which the teeth of a milling cutter or of a screw-cutting hob make contact during successive revolutions with the work-piece under operation, with a view to preventing the formation of facets in the surface thereof.

In the specification to British Letters Patent, dated the 15th January, 1916, No. 103,318, are described automatic means whereby periods of slight acceleration and of slight retardation are alternately caused in the rotative speed of the hob-spindle relatively to that of the work-piece.

The present invention consists in improved mechanism designed to accomplish the same object, but in a more perfect manner; same being illustrated in the accompanying drawings, whereof Figure 1 is an end elevation, Fig. 2 a plan and Fig. 3 a transverse vertical section on a larger scale. Fig. 4 illustrates an alternative mode of carrying out one of the details described with reference to Fig. 3 and Figs. 5 and 6 are diagrams representing the unfolded surfaces of certain face cams hereinafter referred to.

The apparatus comprises a headstock not shown in which is mounted a spindle A for carrying and rotating the work-piece B, this spindle being driven from the back-shaft C of the machine; and from the same shaft is driven a spindle C' which operates the cutter-spindle D through a worm E and worm wheel E'; the worm being provided with a feather $e$ which slides in a feather-way formed in its shaft. Integral with or attached to the worm E is a gear-wheel F on the side of which are formed two cam projections $f$ $f'$ which work against two corresponding projections $g$ $g'$ formed on the side of a second gear-wheel G. The latter is mounted on the worm-shaft C', is free to rotate thereon and is driven from the gear-wheel F through a double pinion H; the number of teeth in the respective members of this pinion being slightly different. Or a like difference may be made in the number of teeth in the gear-wheels F and G. The end thrust of the worm E maintains the two cam surfaces $f$ and $g$ in engagement and is ultimately taken up by a ball-race J. A spring K is, however, provided to insure contact between the said surfaces in the event of the machine being accidentally reversed.

The action of the gear is as follows:— During a predetermined number of revolutions of the worm E, the cam projections $f$ $f'$ upon the one gear-wheel climb the projections $g$ $g'$ upon the contiguous gear-wheel and push the worm E laterally; thereby accelerating the rotation of the worm-wheel and that of the cutter-spindle D whereon it is fixed. As the gear-wheel G is driven through a double pinion H, and assuming one member of the latter to have by way of example 40 teeth and the other member to have 41 teeth, two complete to and fro movements of the worm will occur in $\frac{40}{41}$ths or $\frac{41}{40}$ths of a revolution of the double pinion. The starting point of the lateral movement of the worm will in consequence be earlier or later in each cycle, and the formation of facets in the surface of the work will be prevented.

Figs. 5 and 6 representing the unfolded surfaces of the face cams $f$ $f'$, $g$ $g'$, show their relative positions. When the worm E is at the extremity of its axial movement toward the left, the relative position of the cams $f$ $f'$ and $g$ $g'$ is as represented in the diagram Fig. 5; Fig. 6 illustrating their relative position when the worm E is at the extremity of its axial movement in the opposite direction.

In Fig. 4 is illustrated an alternative mode of construction wherein the cam surfaces are confined to one of the gear-wheels—in the present instance, G; while upon the gear-wheel F, two conical rollers $f^2$ $f^3$ are substituted for the two cam surfaces $f$ $f'$ but work over correspondingly coned cam surfaces $g$ $g'$; the effect being as before described.

I claim:

1. In milling machines of the character wherein the cutter and the work rotate, without axial movement of either, at synchronized speeds, the herein described automatic means for preventing the formation of facets upon the surface machined; same consisting in a face cam arranged to abut against the extremity of the worm whereby the cutter is driven, in conjunction with means for rotating the face cam at a speed slightly different from that imparted to the said cutter with the effect that the worm is caused to partake of a gradual axial movement in one direction, thereby slightly accelerating the rotative speed of the cutter relatively to that of the work, and then to partake of a gradual axial movement in the opposite direction whereby the relative speed of the cutter is correspondingly retarded.

2. In milling machines of the character herein referred to, the combination, with a worm for rotating the work and capable of axial movement, of two gear-wheels mounted on the worm-shaft and having interposed between them cam surfaces, for varying the distance between the said gear-wheels, which latter mesh with a double pinion, the number of teeth in the respective members of the double pinion or in the respective gear-wheels being slightly different, substantially as and for the purpose set forth.

3. In milling machines of the character herein referred to, the modification of the apparatus defined in the preceding claiming clause, according to which cam surfaces and rollers are interposed between the gear-wheels, substantially as herein described.

GEO. RICHARDS.